United States Patent
Liu et al.

(10) Patent No.: US 10,713,568 B2
(45) Date of Patent: *Jul. 14, 2020

(54) APPARATUS AND METHOD FOR EXECUTING REVERSAL TRAINING OF ARTIFICIAL NEURAL NETWORK

(71) Applicant: CAMBRICON TECHNOLOGIES CORPORATION LIMITED, Beijing (CN)

(72) Inventors: Shaoli Liu, Beijing (CN); Qi Guo, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,019

(22) Filed: Jun. 14, 2019

(65) Prior Publication Data
US 2019/0294971 A1    Sep. 26, 2019

Related U.S. Application Data

(63) Continuation of application No. 16/038,872, filed on Jul. 18, 2018, which is a continuation-in-part of (Continued)

(51) Int. Cl.
*G06N 3/08* (2006.01)
*G06N 3/063* (2006.01)
(Continued)

(52) U.S. Cl.
CPC .............. *G06N 3/084* (2013.01); *G06F 9/22* (2013.01); *G06F 9/30145* (2013.01); (Continued)

(58) Field of Classification Search
CPC .. G06N 3/084; G06N 3/06; G06F 9/22; G06F 9/30145
See application file for complete search history.

(56) References Cited

PUBLICATIONS

Gu et al., "A Parallel Computing Platform for Training Large Scale Neural Networks", IEEE, 2013. (Year: 2013).*
(Continued)

*Primary Examiner* — Benjamin P Geib
(74) *Attorney, Agent, or Firm* — Getech Law LLC; Jun Ye

(57) ABSTRACT

An apparatus for executing backpropagation of an artificial neural network comprises an instruction caching unit, a controller unit, a direct memory access unit, an interconnection unit, a master computation module, and multiple slave computation modules. For each layer in a multilayer neural network, weighted summation may be performed on input gradient vectors to calculate an output gradient vector of this layer. The output gradient vector may be multiplied by a derivative value of a next-layer activation function on which forward operation is performed, so that a next-layer input gradient vector can be obtained. The input gradient vector may be multiplied by an input neuron counterpoint in forward operation to obtain the gradient of a weight value of this layer, and the weight value of this layer can be updated according to the gradient of the obtained weight value of this layer.

24 Claims, 7 Drawing Sheets

Related U.S. Application Data application No. PCT/CN2016/078279, filed on Apr. 1, 2016.

(51) Int. Cl.
| | |
|---|---|
| *G06N 3/04* | (2006.01) |
| *G06F 9/30* | (2018.01) |
| *G06F 9/38* | (2018.01) |
| *G06F 15/173* | (2006.01) |
| *G06N 5/00* | (2006.01) |
| *G06F 13/28* | (2006.01) |
| *G06F 9/22* | (2006.01) |

(52) U.S. Cl.
CPC ...... *G06F 9/3838* (2013.01); *G06F 15/17318* (2013.01); *G06N 3/0454* (2013.01); *G06N 3/0481* (2013.01); *G06N 3/063* (2013.01); *G06N 3/08* (2013.01); *G06F 13/28* (2013.01); *G06N 5/003* (2013.01)

(56) References Cited

PUBLICATIONS

Srinivas et al., "Parallel Implementation of Backpropagation on Master Slave Architecture", IEEE, 2007. (Year: 2007).*

* cited by examiner

600

```
┌─────────────────────────────────────────────────────────────────────────┐
│     Storing an IO instruction in a head address of the instruction caching unit │
└─────────────────────────────────────────────────────────────────────────┘
                                         ╲─602
┌─────────────────────────────────────────────────────────────────────────┐
│              Reading the IO instruction from the head address           │
└─────────────────────────────────────────────────────────────────────────┘
                                         ╲─604
┌─────────────────────────────────────────────────────────────────────────┐
│  Reading data including input neurons and derivative values of the activation function in forward │
│           propagation operation as well as input gradient vectors        │
└─────────────────────────────────────────────────────────────────────────┘
                                         ╲─606
┌─────────────────────────────────────────────────────────────────────────┐
│  Reading data of weight value and weight gradient data required by the slave computation modules │
│    from the external address space, and stores them in the corresponding weight value caching unit │
└─────────────────────────────────────────────────────────────────────────┘
                                         ╲─608
┌─────────────────────────────────────────────────────────────────────────┐
│ Configuring values of internal registers of the operation unit, including various constants required by │
│ computation of the neural network of the present layer, accuracy settings of computation in the present │
│              layer, the learning rate in updating the weight values, etc.          │
└─────────────────────────────────────────────────────────────────────────┘
                                         ╲─610
┌─────────────────────────────────────────────────────────────────────────┐
│  Sending the input gradient vectors and input neurons in the forward propagation operation to │
│                     respective slave computation modules                 │
└─────────────────────────────────────────────────────────────────────────┘
                                         ╲─612
┌─────────────────────────────────────────────────────────────────────────┐
│ Performing a vector-scalar-multiplication operation between the weight vector and the input gradient │
│              vector, and returning intermediate results of the output vector       │
└─────────────────────────────────────────────────────────────────────────┘
                                         ╲─614
┌─────────────────────────────────────────────────────────────────────────┐
│                   Adding and combining the intermediate results         │
└─────────────────────────────────────────────────────────────────────────┘
                                         ╲─616
┌─────────────────────────────────────────────────────────────────────────┐
│ Reading a weight value w from the weight value caching unit 64, read the weight gradient dw for this │
│               time and the weight gradient dw' used in updating weight value       │
└─────────────────────────────────────────────────────────────────────────┘
                                         ╲─618
┌─────────────────────────────────────────────────────────────────────────┐
│            Storing the output gradient vector in the master neuron caching unit    │
└─────────────────────────────────────────────────────────────────────────┘
                                         ╲─620
```

Fig. 6

APPARATUS AND METHOD FOR EXECUTING REVERSAL TRAINING OF ARTIFICIAL NEURAL NETWORK

TECHNICAL FIELD

The present disclosure generally relates to the technical field of artificial neural network, and specifically, relates to an apparatus and method for executing the backpropagation of the artificial neural network.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities.

A known method to support the backpropagation of a multilayer artificial neural network is to use a general-purpose processor. Such a method uses a general-purpose register file and a general purpose functional unit to execute general purpose instructions to support the aforementioned algorithm. However, one of the defects of the method is lower operational performance of a single general-purpose processor which cannot meet performance requirements for usual multilayer neural network operations. When multiple general-purpose processors execute concurrently, the inter-communication among them also becomes a performance bottleneck. In addition, a general-purpose processor needs to decode the reverse computation of a multilayer artificial neural network into a long queue of computations and access instruction sequences, and a front-end decoding on the processor brings about higher power consumption.

Another known method to support the backpropagation of the multilayer artificial neural network is to use a graphics processing unit (GPU). Such a method uses a general-purpose register file and a general-purpose stream processing unit to execute general purpose single-instruction-multiple-data (SIMD) instructions to support the aforementioned algorithm. Since GPU is an apparatus specially for executing graph and image operation as well as scientific computation and fails to specially support multi-layer artificial neural network operations, the GPU remains in need of a great amount of front-end decoding to execute multilayer artificial neural network operations, thus producing plenty of additional overheads. Besides, since GPU only contains rather small on-chip caching, then model data (weight values) of a multilayer artificial neural network has to be repeatedly moved from the off-chip, and off-chip bandwidth becomes a main performance bottleneck, causing huge power consumption.

SUMMARY

One aspect of the present disclosure provides an apparatus for executing backpropagation of an artificial neural network, comprising an instruction caching unit, a controller unit, a direct memory access unit, an H tree module, a master computation module, and multiple slave computation modules, wherein the instruction caching unit is for caching instructions, the controller unit is for reading instructions from the instruction caching unit and decoding such instructions into micro instructions controlling operations of the H tree module, the master computation module and slave computation modules, the direct memory access unit for writing data from the memory into data caching units corresponding to the master computation module and each slave computation module, or reading data to the memory from said data caching units; for the H tree module, in the stage of starting computation of backpropagation of each layer neural network, the master computation module transmits an input gradient vector of this layer to all slave computation modules through the H tree module, and after completion of computation process in slave computation modules, the H tree module step-by-step adds together each two of partial sums of output gradient vectors of each computation module to calculate an output gradient vector of this layer, the master computation module for using an output gradient vector of this layer to complete a subsequent computation in computation of each layer, and each slave computation module using the same input gradient vectors and their respective weight value data to concurrently calculate partial sums of corresponding output gradient vectors.

Another aspect of the present disclosure provides a method for executing backpropagation of a single-layer artificial neural network by using the aforementioned apparatus.

Another aspect of the present disclosure provides a method for executing backpropagation of a multilayer artificial neural network by using the aforementioned apparatus.

BRIEF DESCRIPTION OF THE DRAWINGS

To perfectly understand the present disclosure and the advantages thereof, the present disclosure is described as below with reference to the drawings:

FIG. 6 is a flowchart illustrating a process of a single-layer artificial neural network computation according to examples of the present disclosure.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

According to the following descriptions of exemplary embodiments of the present disclosure, those skilled in the art can easily obtain a general picture of the advantages and outstanding features of the present disclosure with reference to the accompanying drawings.

In the present disclosure, terms like "comprise", "include" and their own derivatives means comprisal, rather than restriction; and term "or" is inclusive, with a meaning of "and/or".

In the specification, various examples as below for describing the principle of the present disclosure are merely used for explanation, which should not be interpreted by any means to limit the protection scope thereof. Reference to the following descriptions of the accompanying drawings is used to help fully comprehend the exemplary embodiments of the present disclosure that are limited by claims and equivalents thereof. To be helpful for understanding, the following description comprises multiple particulars that should be considered as merely exemplary though. Thus, a person skilled in the art can make various changes to and modify the present disclosure without departing from the scope thereof. Besides, for the sake of clarity and briefness, descriptions of those commonly known functions and structures are omitted. Furthermore, throughout all the drawings, the same reference numbers are used for marking the similar functions and operations.

A backpropagation of a multilayer artificial neural network according to examples of the present disclosure comprises two or more layers of multiple neurons. For each layer, firstly, a weighted summation operation is performed on an input gradient vector to calculate an output gradient vector of this layer. The output gradient vector is multiplied by a derivative value of an activation function of a next layer in a forward operation, so that the input gradient vector for the next layer can be obtained. The input gradient vector is contrapuntally multiplied by an input neuron in the forward operation to obtain a gradient of weight values of this layer, and the weight value of this layer can be updated according to the obtained gradient of the weight values of this layer.

Figure 1A:
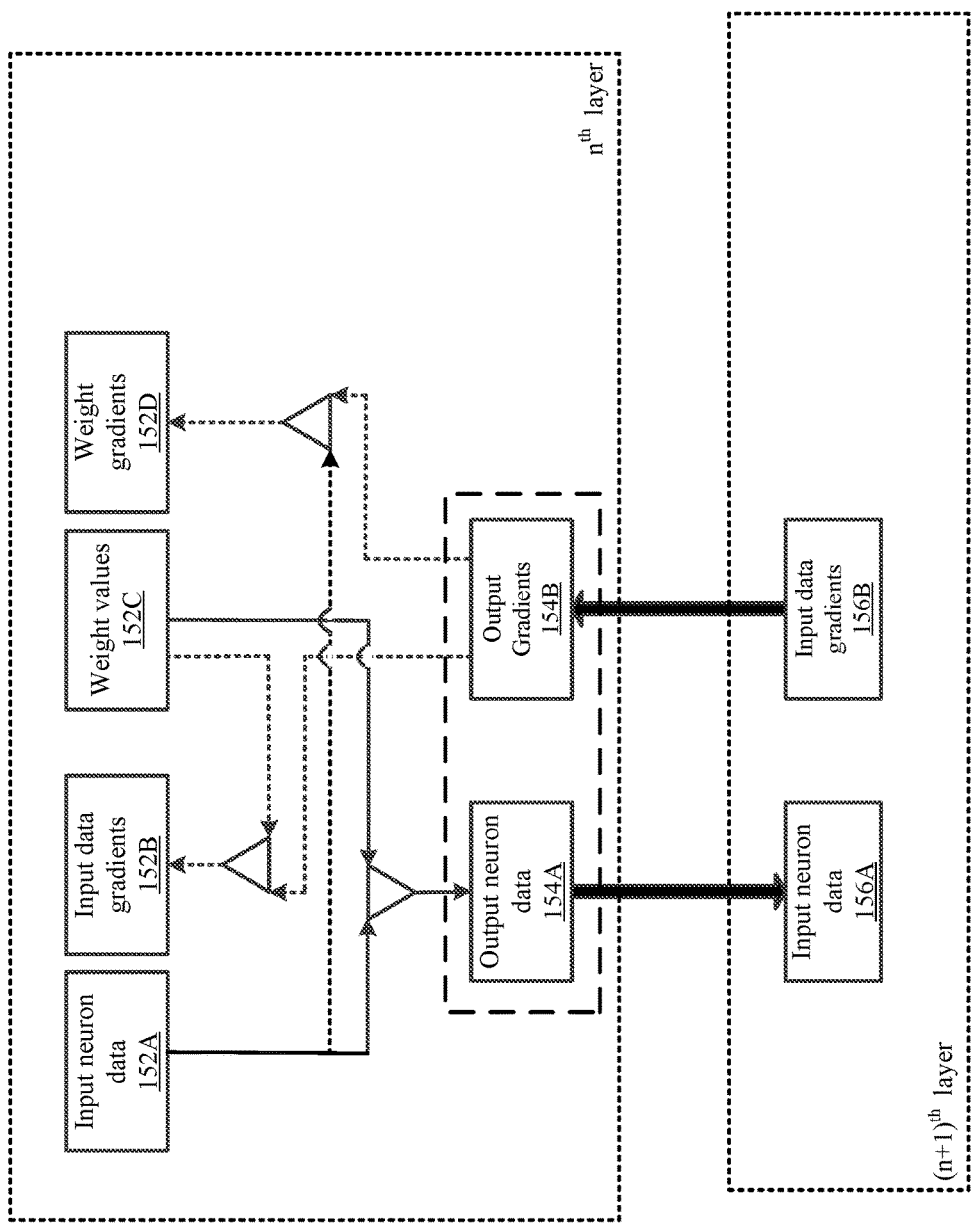
FIG. 1A is a block diagram illustrating an example computing process for MNNs.

FIG. 1A is a block diagram illustrating an example computing process 100 at an MNN acceleration processor for neural networks. The computing process 100 is a merely example showing neural network operations that involve input data and weight values and is not limited to such operations. For example, other unshown neural network operations may include pooling operations, etc.

As depicted, the example computing process 100 may be performed from the n layer to the $(n+1)^{th}$ layer. The term "layer" here may refer to a group of operations, rather than a logic or a physical layer. A triangular-shaped operator ($\Delta$ as shown in FIG. 1) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire process. Rather, the layers of operations may refer to any two consecutive layers in a neural network. As described below in greater detail, the computing process from the $n^{th}$ layer to the $(n+1)^{th}$ layer may be referred to as a forward propagation process; the computing process from $(n+1)^{th}$ layer to the $n^{th}$ layer may be referred to as a backward propagation (also may be interchangeably referred to as backpropagation) process.

The forward propagation process may start from input neuron data received at the $n^{th}$ layer (e.g., input neuron data 152A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 152A may be multiplied or convolved by one or more weight values 152C. The results of the multiplication or convolution may be transmitted as output data neuron 154A. The output neuron data 154A may be transmitted to the next layer (e.g., the $(n+1)^{th}$ layer) as input neuron data 156A. The forward propagation process may be shown as the solid lines in FIG. 1.

The backward propagation process may start from the last layer of the forward propagation process.

For example, the backward propagation process may include the process from the $(n+1)^{th}$ layer to the $n^{th}$ layer. During the process, the input data gradients 156B may be transmitted to the $n^{th}$ layer as output gradients 154B. The output gradients 154B may then be multiplied or convolved by the input neuron data 152A to generate weight gradients 152D. Additionally, the output gradients 154B may be multiplied by the weight values 152C to generate input data gradients 152B. The backward propagation process may be shown as the dotted lines in FIG. 1.

Figure 1B:
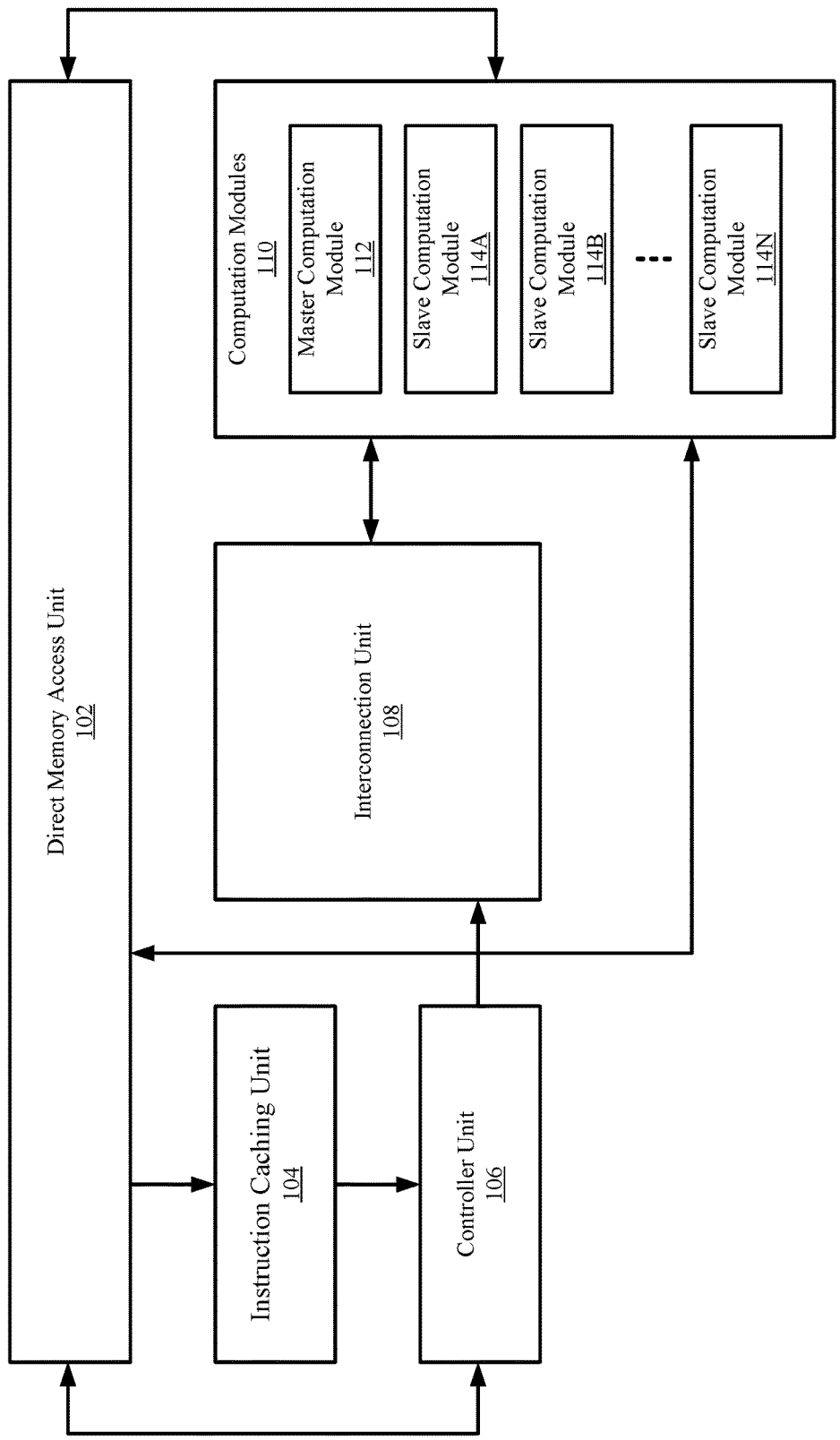
FIG. 1B is an exemplary block diagram of an overall structure of an apparatus for executing backpropagation of the artificial neural network according to examples of the present disclosure.

FIG. 1B is an exemplary block diagram of an overall structure of an apparatus for executing the backpropagation of the multilayer neural network according to examples of the present disclosure. As shown in FIG. 1, the apparatus comprises an instruction caching unit 104, a controller unit 106, a direct memory access unit 102, an interconnection unit 108, a plurality of computation modules 110 that may include a master computation module 112, and multiple slave computation modules 114 (e.g., 114A, 114B . . . 114N). Any of the above-mentioned components or devices may be implemented by a hardware circuit (e.g., application specific integrated circuit (ASIC)).

The instruction caching unit 104 may be configured to receive an instruction from the direct memory access unit 102 and cache or store the instruction.

The controller unit 106 may be configured to read the instruction from the instruction caching unit 104 and transcode or decode the instruction into micro-instructions for controlling the computation modules 110 and the direct memory access unit 102.

The direct memory access unit 102 may be configured to access an external address space or external storage devices such that the direct memory access unit 102 may directly read and write data from and in each caching unit included in the computation modules 110.

The interconnection unit 108 may be configured to interface the master computation module 112 and the slave computation modules 114. That is, data may be transmitted from the master computation module 112 to the slave computation modules 114 and/or from the slave computation modules 114 to the master computation module 112. In at least some examples, the interconnection unit 108 may be implemented as a ring-shaped network, a centralized network, or a binary tree.

Figure 2:
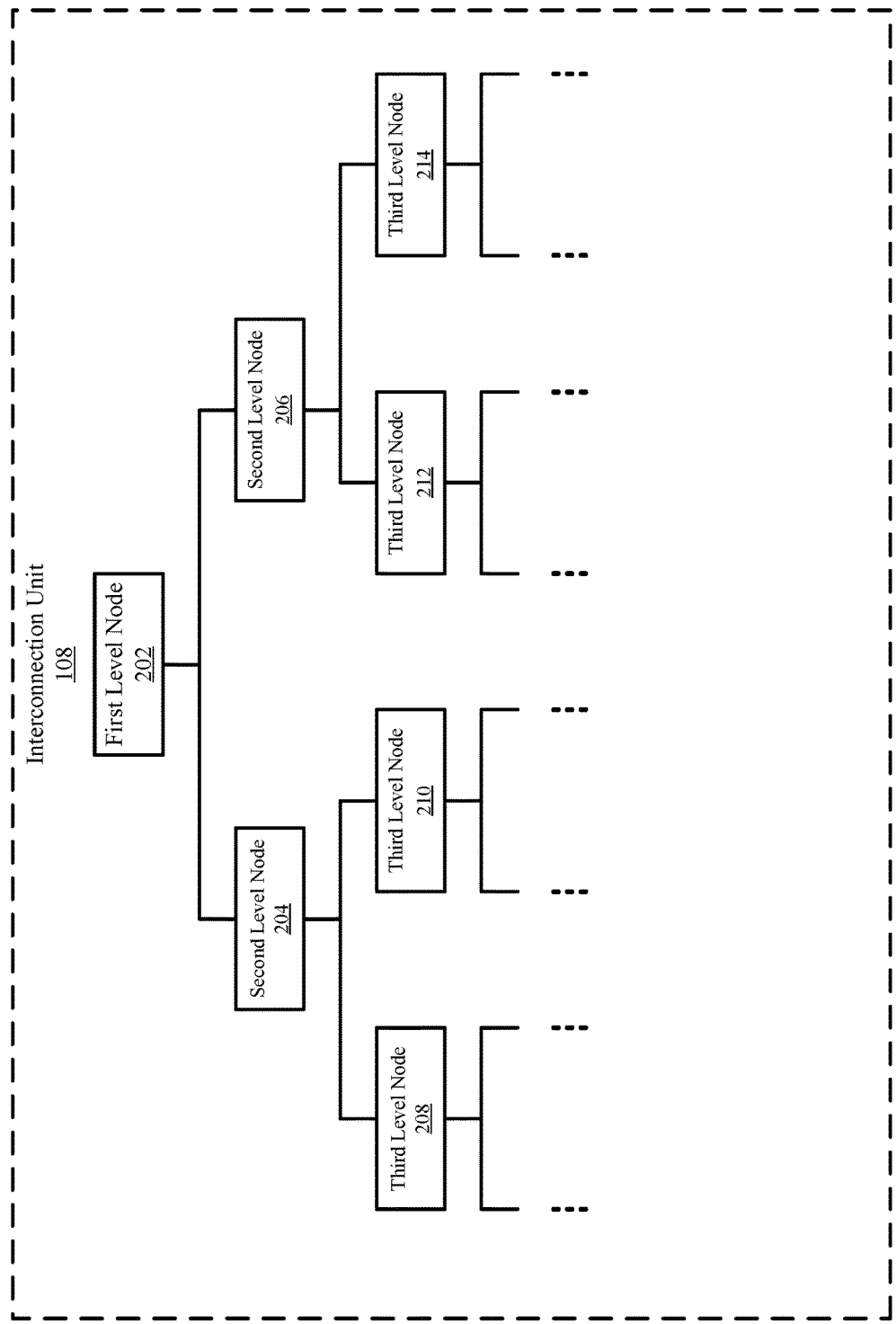
FIG. 2 schematically shows a structure of an H tree module of an apparatus for executing backpropagation of the artificial neural network according to examples of the present disclosure.

FIG. 2 schematically shows an example structure of the interconnection unit 108 that constitutes a data channel between the master computation module 112 and the multiple slave computation modules 114. As depicted, the interconnection module 108 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

In the multilayer neural network, an input gradient vector may be calculated by the master computation module 112 and transmitted through the interconnection module 108, to the respective slave computation modules 114. Each of the slave computation modules 114 may be configured to parallelly calculate a portion of an output gradient vector, e.g., an element of the of output gradient vector. The portions of the output gradient vector may be combined or added by the nodes of the interconnection module 108 at the different levels. The root node (e.g., first level node 202) may output the output gradient vector based on the data collected from the nodes at the multiple lower levels.

Figure 3:
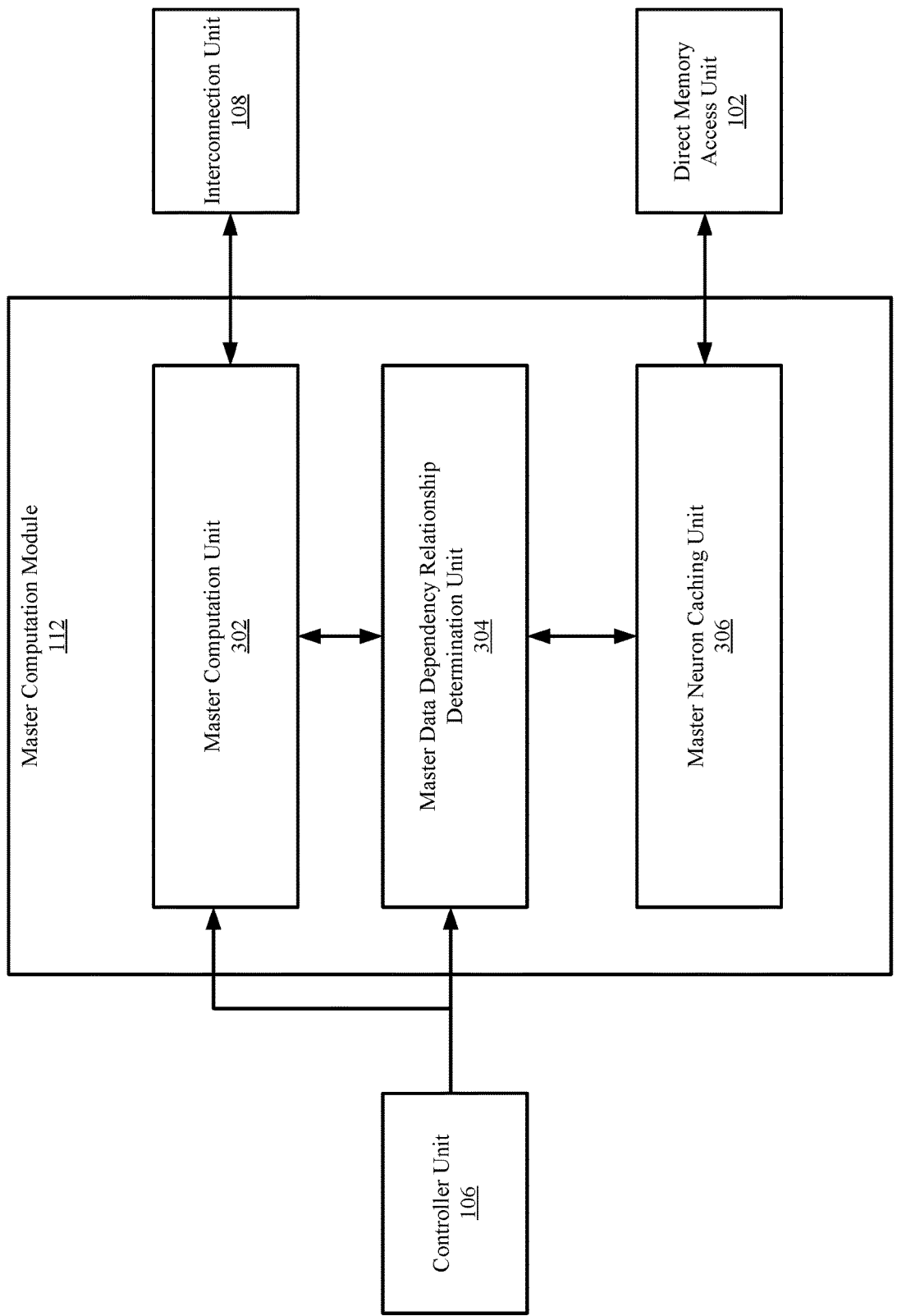
FIG. 3 is an exemplary block diagram of a structure of a master computation module of an apparatus for executing backpropagation of the artificial neural network according to examples of the present disclosure.

FIG. 3 is an exemplary block diagram of a structure of the master computation module 112 of the apparatus for executing the backpropagation of the artificial neural network according to examples of the present disclosure. As shown in FIG. 3, the master computation module 112 comprises a master computation unit 302, a master data dependency relationship determination unit 304, and a master neuron caching unit 306.

The master neuron caching unit 306 may be configured to cache or temporarily store data received from or to be transmitted to the direct memory access unit 102. The master computation unit 302 may be configured to perform various computation functions. The master data dependency relationship determination unit 304 may interface with the master computation unit 302 and the master neuron caching unit 306 and may be configured to prevent conflicts in reading and writing the data stored in the master neuron caching unit 306. For example, the master data dependency relationship determination unit 304 may be configured to determine whether there is a dependency relationship (i.e., a conflict) in terms of data between a micro-instruction which has not been executed and a micro-instruction being executed. If not, the micro-instruction may be allowed to be executed immediately; otherwise, the micro-instruction may not be allowed to be executed until all micro-instructions on which it depends have been executed completely. For example, all micro-instructions sent to the master data dependency relationship determination unit 304 may be stored in an instruction queue within the master data dependency relationship determination unit 304. In the instruction queue, if the target range of reading data by a reading instruction conflicts or overlaps with the target range of writing data by a writing instruction of higher priority in the queue, then a dependency relationship may be identified, and such reading instruction cannot be executed until the writing instruction is executed. Also, the master data dependency relationship determination unit 304 reads an input gradient vector from the master neuron caching unit 306 and then send the input gradient vector to the slave computation modules 114 through the interconnection module 108. The output data from the slave computation modules 114 may be directly sent to the master computation unit 302 through the interconnection module 108. Instructions output by the controller unit 106 are sent to the master computation unit 302 and the master data dependency relationship determination unit 304 so as to control the operations thereof.

Figure 4:
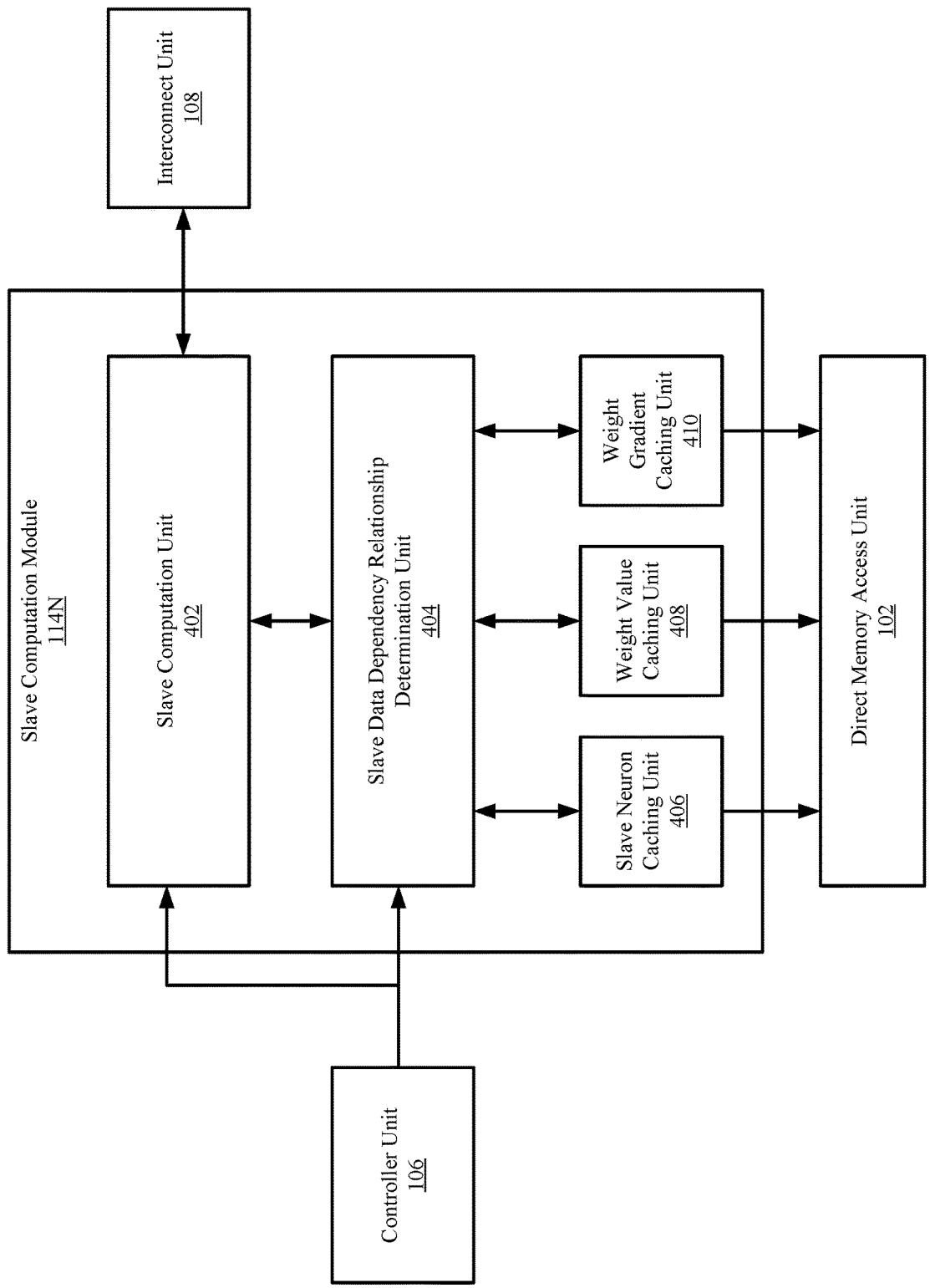
FIG. 4 is an exemplary block diagram of a structure of a slave computation module of an apparatus for executing backpropagation of the artificial neural network according to examples of the present disclosure.

FIG. 4 is an exemplary block diagram of a structure of one of the slave computation modules 114 (e.g., slave computation module 114N as shown) of the apparatus for executing the backpropagation of multilayer neural networks according to examples of the present disclosure. As shown in FIG. 4, the slave computation module 114N comprises a slave computation unit 402, a slave data dependency relationship determination unit 404, a slave neuron caching unit 406, a weight value caching unit 408 and a weight gradient caching unit 410.

The slave computation unit 402 may be configured to receive micro-instructions from the controller unit 106 and perform arithmetical logic operations.

The slave data dependency relationship determination unit 404 may be configured to perform the read/write operations on the caching units including the slave neuron caching unit 406, the weight value caching unit 408, and the weight gradient caching unit 410 during the computation process. The slave data dependency relationship determination unit 404 may be configured to prevent conflicts in reading and writing of the data in the caching units including the slave neuron caching unit 406, the weight value caching unit 408, and the weight gradient caching unit 410. For example, the slave data dependency relationship determination unit 404 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 404 may be stored in an instruction queue within the slave data dependency relationship determination unit 404. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 406 may be configured to cache or temporarily store data of the input gradient vector and portions of an output gradient vector calculated by the slave computation modules 114.

The weight value caching unit 408 may be configured to cache or temporarily store weight vectors for slave computation modules 114 in computation process. For each slave computation module, e.g., 114N, a column vector in a weight matrix corresponding to the slave computation module may be stored. A weight vector may refer to a vector that includes one or more weight values as the elements.

The weight gradient caching unit 410 may be configured to cache or temporarily store weight gradients for the corresponding slave computation modules to update weight values. Weight gradients stored by each slave computation module 114 may be corresponding to a weight vector stored by the weight value caching unit 408 in the same slave computation module.

The slave computation modules 114 may be configured to parallelly perform a portion of the backpropagation of multilayer neural network of each layer during the computation of the output gradient vector, and to update the weight values. Taking the multilayer neural network full connection layer (MLP) as an example, the process may be represented by the following equation: out_gradient=$w^T$*in_gradient, in which $w^T$ represents a transpose of a weight matrix includes the weight vectors, * represents a multiplication operation, in_gradient represents the input gradient vector output from the $(n+1)^{th}$ layer to the $n^{th}$ layer, and out_gradient represents an output gradient vector at the $n^{th}$ layer. Notably, during the backpropagation process, data flow may be opposite to that in the forward propagation process, which are both illustrated in FIG. 1A. As such, the in_gradient may refer to the output gradient 154B and the out_gradient may refer to the input data gradients 152B.

The multiplication between the transposed weight matrix $w^T$ and the input gradient vector in_gradient may be divided as multiple independent computing subtasks that may be parallelly executed simultaneously. In some examples, the output gradient vector out_gradient and the input gradient vector in_gradient may be column vectors. Each slave computation module 114 may be configured to only calculate a multiplication between the corresponding partial scalar elements in the input gradient vector in_gradient and a corresponding column vector in the weight matrix w. Each calculated result of the multiplication may be an intermediate result to be aggregated. That is, these intermediate results may be added and combined together in the interconnection unit 108 to generate the output gradient vector. In other words, the computation process may include a parallel process of intermediate results computation by the slave computation modules 114 and a later process of aggregation (e.g., summation and combination) by the interconnection unit 108.

Each slave computation module 114 may be configured to simultaneously multiply the input gradient vector (e.g., output gradients 154B) by an input vector of this layer (e.g., input neuron data 152A) to obtain the weight gradients (e.g., weight gradients 152D) in order to update the weight values stored in the present slave computation module 114.

Forward propagation operation and backpropagation are two main processes in neural network algorithm. When neural network trains or updates weight values in the neural network, the neural network may first calculate an output vector based on an input vector at each layer of the forward propagation process (e.g., output neuron data 154A) and then layer-by-layer reversely train or update weight values of each layer according to the difference between the output vector (e.g., output neuron data 154A) and the input vector (e.g., input neuron data 152A). In the forward propagation process, output vectors of each layer (e.g., output neuron data 154A) and derivative values of the activation function may be stored such that the output vectors and the derivative values of the activation function may be available at the beginning of the backpropagation. The output vectors (e.g., output neuron data 154A) of each layer in the forward propagation operation may be received via the direct memory access unit 102 and cached in the master computation module 112. The output vectors may be further sent to the slave computation modules 114 through the interconnection module 108.

The master computation module 112 may be configured to perform subsequent computations based on the output gradient vectors generated at each layer during the backpropagation process. For example, an output gradient vector at the $(n+1)^{th}$ layer (e.g., input gradients 156B) may be multiplied by the derivative of the activation function in the forward propagation operation by the master computation module 112 to generate an input gradient vector at the $n^{th}$ layer (e.g., output gradients 154B). The derivatives of the activation function in the forward propagation operation may be stored and available at the time of starting backpropagation computation, which may be cached in the master computation module 112 through the direct memory access unit 102.

Figure 5:
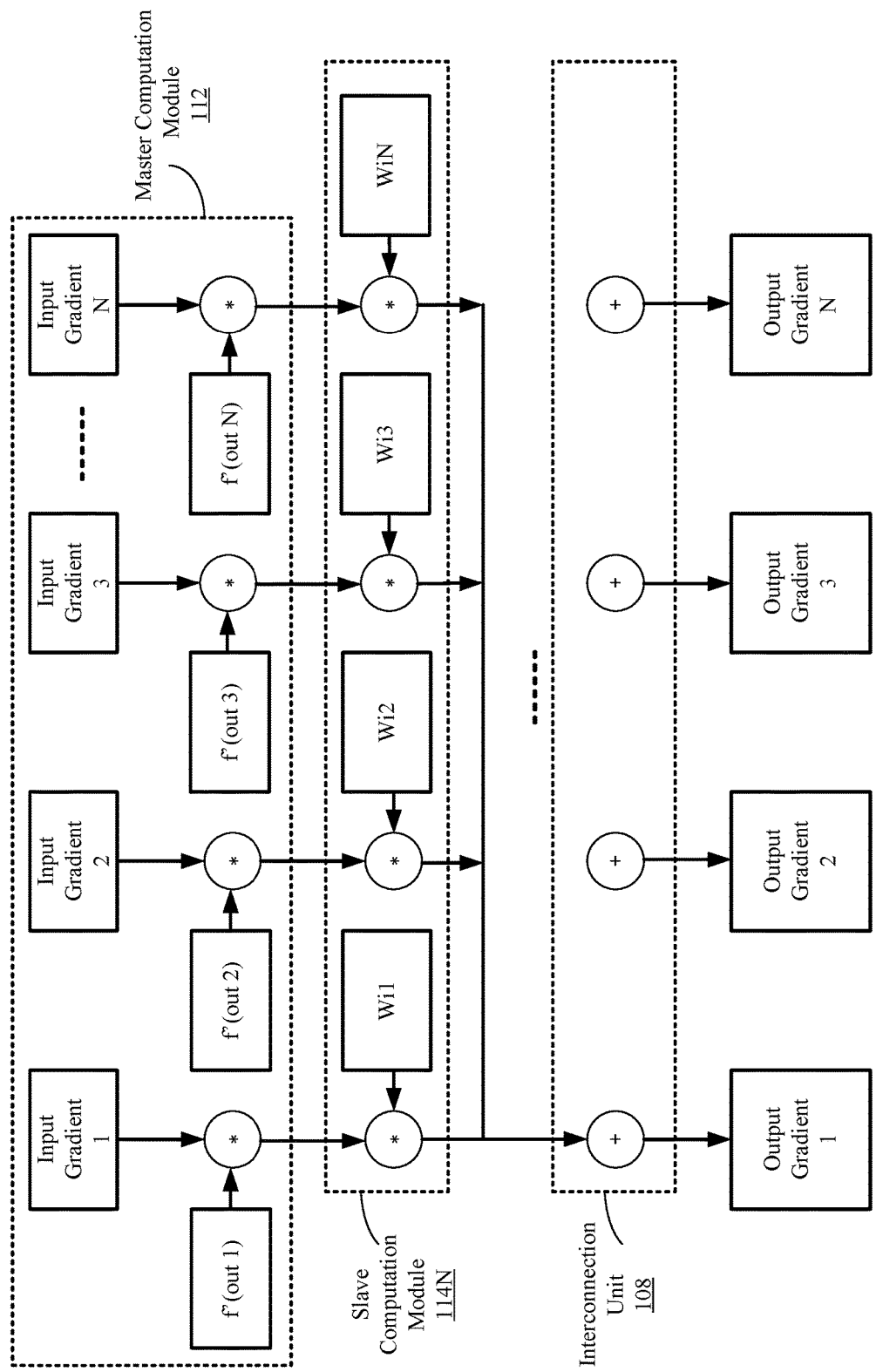
FIG. 5 is an exemplary block diagram of a process of backpropagation of the artificial neural network according to examples of the present disclosure.

FIG. 5 is an exemplary block diagram of a process of executing the backpropagation of the multilayer neural network according to examples of the present disclosure. The process of calculating the output gradient vector may be represented in accordance with the following equation: out_gradient=$w^T$*in_gradient, in which the matrix vector multiplication between a transpose of the weight matrix w and the input gradient vector in_gradient may be divided into independent parallel computing subtasks. Each slave computation module 114 may be configured to calculate a portion of the output gradient vector as an intermediate result. Summation operations may be performed on the intermediate results in the interconnection unit 108 to generate the output gradient vector.

As depicted in FIG. 5, an input gradient vector generated by a previous layer in the backpropagation operation (e.g., input data gradients 156B) may be multiplied with a corresponding derivative of the activation function and further multiplied with the weight matrix to generate the output gradient vector (e.g., output gradients 154B).

With reference to FIG. 5, a vector (e.g., [input gradient1, ..., input gradientN] in FIG. 5) may be output from the $(n+1)^{th}$ layer (e.g., input data gradients 156B in FIG. 1) to the $n^{th}$ layer. The vector may be multiplied by a derivative value of an activation function (e.g., [f'(out1), ..., f'(outN)] in FIG. 5) of the $n^{th}$ layer to obtain the input gradient vector of the $n^{th}$ layer (e.g., output gradients 154B). It is notable that, in the backpropagation process, operations may be performed following the dotted lines and arrows in FIG. 1. Thus, the input gradient vector of the $n^{th}$ layer may be labeled as "output gradients 154B," for example, in FIG. 1.

Further, as shown in FIG. 5, the above multiplication may be performed in the master computation module 112. The input gradient vector of the $n^{th}$ layer may then be transmitted via the interconnection unit 108 to the slave computation modules 114 and temporarily stored in the slave neuron caching unit 406 of the slave computation modules 114. Then, the input gradient vector of the $n^{th}$ layer may be multiplied by the weight matrix to calculate intermediate results. For example, the $i^{th}$ slave computation module may be configured to calculate an outer product between the $i^{th}$ scalar of the input gradient vector and a column vector $[W_{i1}, ..., W_{iN}]$ in the weight matrix, and the calculated intermediate results may be added and combined to generate the output gradient vector (shown as [output gradient1, ..., output gradientN] in FIG. 5).

Further, the slave computation modules 114 may be configured to update weight values stored therein. The process of updating weight gradients may represented as the following equation: dw_ij=x_j*in_gradient_i, in which x_j is the $j^{th}$ element of the input vector (e.g., input data 152A; i.e., the output data of the $(n-1)^{th}$ layer) of the $n^{th}$ layer in the forward propagation operation, and in_gradient_i is the $i^{th}$ element of the input gradient vector, e.g., output gradients 154B (i.e., the product of input gradient and derivative f in FIG. 5) of the $n^{th}$ layer in the backpropagation computation, dw_ij may refer to a matrix including the weight gradients 152D, and * may refer to an outer product multiplication operation. The inputs of the $n^{th}$ layer in forward propagation operation may be stored and available at the beginning of the backpropagation. The inputs of the $n^{th}$ layer may be sent to the slave computation modules 114 through the interconnection unit 108 and temporarily stored in the slave neuron caching unit 406. In the slave computation modules 114, after completion of calculating the intermediate results of the output gradient vector, the $i^{th}$ scalar of the input gradient vector (e.g., output gradients 154B) may be multiplied (e.g., outer product multiplication) by the input vector of the $n^{th}$ layer (e.g., input data 152A) in the forward propagation operation to generate weight gradients (e.g., weight gradients 152D), and to accordingly update the weight value 152C.

FIG. 6 is a flowchart of an example backpropagation process 100 of a single-layer artificial neural network according to one example. The flowchart illustrates a process of implementing the backpropagation of the single-layer neural network as shown in FIG. 5 by using an apparatus and an instruction set of the present disclosure.

At block 602, an IO instruction may be pre-stored into the head address of the instruction caching unit 104. The IO instruction reads in the input data required by computation from an external address space, and storing the data back into the external space after completion of computation At block 604, the operation starts. The controller unit 106 may read the IO instruction from the head address of the instruction caching unit 104; and according to the decoded micro-instructions, the direct memory access unit 102 may read all instructions associated with the backpropagation of the single-layer artificial neural network from the external address space, and then caches them in the instruction caching unit 104.

At block 606, the controller unit 106 then may be configured to read in a next IO instruction from the instruction caching unit 104; and according to the decoded micro-instructions, the direct memory access unit 102 may be configured to read all data required by the master computation module 112 from the external address space or external storage devices to the master neuron caching unit 306 of the master computation module 112, said data comprising input neurons and derivative values of the activation function in forward propagation operation as well as input gradient vectors.

At block 608, the controller unit 106 may be configured to in a next IO instruction from the instruction caching unit 104; and according to the decoded micro-instructions, the direct memory access unit 102 may be configured to read all the data of weight value and weight gradients required by the slave computation modules 114 from the external address space, and store them in the corresponding weight value caching unit 408 and the corresponding weight gradient caching unit 410 of a respective one of the slave computation modules 114.

At block 610, the controller unit 106 may be configured to read in a next CONFIG instruction from the instruction caching unit 104; and according to the parameters in the decoded micro-instructions, the master computation unit 302 and the slave computation units 402 may configure values of internal registers of the operation unit, including various constants required by computation of the neural network of the present layer, accuracy settings of computation in the present layer, the learning rate in updating the weight values, etc. The CONFIG instruction configures various constants required by computation of the current layers prior to starting computation of the multilayer neural network of each layer.

At block 612, the controller unit 106 may then be configured to read in a next COMPUTE instruction from the instruction caching unit, and according to the decoded micro-instructions, the master computation unit 302 may be configured to send the input gradient vectors and input data in the forward propagation operation to respective slave computation modules 114 through the interconnection unit 108, said input gradient vectors and input data in the forward propagation operation may be stored in the slave neuron caching unit 406 of the slave computation modules 114. The COMPUTE instruction completes arithmetical logic computation of the multilayer neural network of each layer.

At block 614, according to the micro-instructions decoded from the COMPUTE instruction, the slave computation units 402 of the slave computation modules 114 may be configured to read weight vectors (i.e. column vectors of the weight matrix stored by the corresponding slave computation module) from the weight value caching unit 408, complete a vector-scalar-multiplication operation between the weight vector and the input gradient vector, and return intermediate results of the output gradient vector through the interconnection unit 108. Further, the slave computation modules 114 may be configured to multiply the input gradient vector by the input data to obtain a weight gradient which then is stored in the weight gradient caching unit 410.

At block 616, in the interconnection unit 108, the intermediate results of the output gradients returned from the respective slave computation module 114 may be added together and combined to generate the output gradient vector.

At block 618, the master computation module 112 may obtain a returned value of the interconnection unit 108. According to the micro-instructions decoded from the COMPUTE instruction, the master computation module 112 may be configured to read the derivative value of the activation function in forward propagation operation from the master neuron caching unit 306, to multiply the derivative value by the returned output vector to obtain the input gradient vector for the backpropagation of the next layer, and to write it back to the master neuron caching unit 306.

At block 620, the controller unit 106 may then be configured to read in a next COMPUTE instruction from the instruction caching unit 104; and according to the decoded micro-instructions, the slave computation modules 114 may read a weight value w from the weight value caching unit 408, read the weight gradient dw for this time and the weight gradient dw' used in updating weight value last time from the weight gradient caching unit, thereby updating the weight value w.

At block 620, the controller unit 106 may then read in a next IO instruction from the instruction caching unit 104; according to the decoded micro-instructions, the direct memory access unit 102 may be configured to store the output gradient vector in the master neuron caching unit 306 into a designated address of the external address space; and the operation ends.

As for a multilayer artificial neural network, the implementation procedures thereof are similar to those of the single-layer artificial neural network. After the artificial neural network of the previous layer is done with execution, computation instructions of the next layer may take the output gradient vector calculated in the master computation module as the input gradient vector for the training of the next layer, so as to perform the computation process as above, wherein the weight address and weight gradient address in the instructions may also be changed to addresses corresponding to this layer.

By adopting the apparatus and instruction set for executing the backpropagation of the artificial neural network, problems such as insufficient operational performance of CPU and GPU, and large overhead for front-end decoding have been solved, while the support for the forward operation of the multilayer artificial neural network has been effectively enhanced.

By adopting specialized on-chip cache directed to the backpropagation of the multilayer artificial neural network, reusability of the input neuron and weight data has been fully explored, while repeated reading of such data from memory has been avoided, memory access bandwidth has been reduced, and problem that memory bandwidth becomes a performance bottleneck of the forward operation of reusability multilayer artificial neural network has been averted.

The process and method as depicted in the foregoing drawings may be executed through processing logics including hardware (e.g. circuit, special logic, etc.), firmware, software (e.g. a software embodied in a non-transient computer readable medium), or combination of each two. Although the above describes the process or method in light of certain sequential operation, it should be understood that certain operation described herein may be executed in different orders. Additionally, some operations may be executed concurrently rather than sequentially.

In the above of the specification, examples of the present disclosure are expounded with reference to specific exemplary embodiments thereof. A person skilled in the art can make various changes to and modify the present disclosure without departing from the scope thereof. Correspondingly, the specification and accompanying drawings should be deemed as illustrative, rather than restrictive.

We claim:

1. An apparatus for backpropagation of a multilayer neural network, comprising:
    a master computation circuit configured to:
        receive a first output gradient vector from an adjacent layer, and
        respectively multiply each element of the first output gradient vector with a derivative of an activation function of a current layer to obtain an input gradient vector; and
    multiple slave computation circuits connected to the master computation circuit via an interconnection circuit, wherein the multiple slave computation circuits are configured to:
        parallelly calculate gradients of weight values of the current layer based on the input gradient vector, and
        update the weight values of the current layer based on the respectively calculated gradients.

2. The apparatus of claim 1, wherein the multiple slave computation circuits are configured to parallelly calculate portions of a second output gradient vector based on the input gradient vector calculated by the master computation circuit.

3. The apparatus of claim 2, wherein the interconnection circuit is configured to combine the portions of the second output gradient vector to generate the second output gradient vector.

4. The apparatus of claim 3,
    wherein the interconnection circuit is structured as a binary tree including one or more levels, each of which includes one or more nodes,
    wherein each of the nodes at one level is connected to two nodes at a lower level, and
    wherein each of the nodes transmits same data to the two nodes at the lower level and combines data received from the two nodes at the lower level.

5. The apparatus of claim 1, wherein each of the slave computation circuits further includes a slave neuron caching circuit configured to store input data.

6. The apparatus of claim 1, further comprising a controller circuit configured to decode an instruction into one or more groups of micro-instructions, wherein the one or more groups of micro-instructions respectively control operations of the master computation circuit and the multiple slave computation circuits.

7. The apparatus of claim 6, wherein the controller circuit is further configured to:
    instruct the master computation circuit to perform one of the one or more groups of micro-instructions; and
    instruct the slave computation circuits to perform other groups of the micro-instructions.

8. The apparatus of claim 6, wherein the master computation circuit includes:
    a master neuron caching circuit configured to cache data;
    a master computation circuit configured to receive the first output gradient vector from the interconnection circuit; and
    a master data dependency relationship determination circuit configured to temporarily prevent the instruction from being executed based on a determination that a conflict exists between the instruction and other instructions.

9. The apparatus of claim 6, wherein each of the slave computation circuits includes:
    a slave computation circuit configured to receive the one or more groups of micro-instructions and to perform arithmetic logical operations; and
    a slave data dependency relationship determination circuit configured to perform reading/writing operations to a slave neuron caching circuit, a weight value caching circuit, and a weight gradient caching circuit based on a determination that no conflict exists between the reading/writing operations.

10. The apparatus of claim 6, wherein the instruction is selected from the group consisting of
    a CONFIG instruction for configuring constants required by computation of the current layer prior to starting computation of artificial neural network of each layer,
    a COMPUTE instruction for completing arithmetical logic computation of the multilayer neural network of each layer, and
    an IO instruction for reading in the input data required by computation from an external address space and storing the data back into external space after completion of computation.

11. The apparatus of claim 1, further comprising:
    an instruction caching circuit configured to store an instruction; and
    a direct memory access circuit configured to read data from caching circuits of the multiple slave computation circuits and the master computation circuit to an external memory device and write data from the external memory device to the caching circuits of the multiple slave computation circuits and the master computation circuit.

12. The apparatus of claim 11, wherein at least one of the slave computation circuits, the master computation circuit, the controller circuit, the instruction caching circuit, the direct memory access circuit is an application-specific integrated circuit.

13. A method for backpropagation of a multilayer neural network, comprising:

receiving, by a master computation circuit, a first output gradient vector from an adjacent layer;

respectively multiplying, by the master computation circuit, each element of the first output gradient vector with a derivative of an activation function of a current layer to obtain an input gradient vector;

parallelly calculating, by multiple computation circuits connected to the master computation circuit via an interconnection circuit, gradients of weight values of the current layer based on the input gradient vector; and updating, by the multiple computation circuits, the weight values of the current layer based on the respectively calculated gradients.

14. The method of claim 13, further comprising parallelly calculating, by the multiple slave computation circuits, portions of a second output gradient vector based on the input gradient vector calculated by the master computation circuit.

15. The method of claim 14, further comprising combining, by the interconnection circuit, the portions of the second output gradient vector to generate the second output gradient vector.

16. The method of claim 15,
wherein the interconnection circuit is structured as a binary tree including one or more levels, each of which includes one or more nodes,
wherein each of the nodes at one level is connected to two nodes at a lower level, and
wherein each of the nodes transmits same data to the two nodes at the lower level and combines data received from the two nodes at the lower level.

17. The method of claim 13, further comprising storing, by a slave neuron caching circuit included in each of the slave computation circuits, input data.

18. The method of claim 13, further comprising decoding, by a controller circuit, an instruction into one or more groups of micro-instructions, wherein the one or more groups of micro-instructions respectively control operations of the master computation circuit and the multiple slave computation circuits.

19. The method of claim 18, further comprising:
storing, by an instruction caching circuit, the instruction;
reading, by a direct memory access circuit, data from caching circuits of the multiple slave computation circuits and the master computation circuit to an external memory device; and
writing, by the direct memory access circuit, data from the external memory device to the caching circuits of the multiple slave computation circuits and the master computation circuit.

20. The method of claim 19, wherein at least one of the slave computation circuits, the master computation circuit, the controller circuit, the instruction caching circuit, the direct memory access circuit is an application-specific integrated circuit.

21. The method of claim 18, further comprising:
instructing, by the controller circuit, the master computation circuit to perform one of the one or more groups of micro-instructions; and
instructing, by the controller circuit, the slave computation circuits to perform other groups of the micro-instructions.

22. The method of claim 18, further comprising:
caching data by a master neuron caching circuit of the master computation circuit;
receiving, by a master computation circuit of the master computation circuit, the first output gradient vector from the interconnection circuit; and
temporarily preventing, by a master data dependency relationship determination circuit of the master computation circuit, the instruction from being executed based on a determination that a conflict exists between the instruction and other instructions.

23. The method of claim 18, further comprising:
receiving, by a slave computation circuit of each of the slave computation circuits, the one or more groups of micro-instructions;
performing, by a slave computation circuit of each of the slave computation circuits; arithmetic logical operations; and
performing, bye a slave data dependency relationship determination circuit of each of the slave computation circuits, reading/writing operations to a slave neuron caching circuit, a weight value caching circuit, and a weight gradient caching circuit based on a determination that no conflict exists between the reading/writing operations.

24. The method of claim 18, wherein the instruction is selected from the group consisting of
a CONFIG instruction for configuring constants required by computation of the current layer prior to starting computation of artificial neural network of each layer,
a COMPUTE instruction for completing arithmetical logic computation of the multilayer neural network of each layer, and
an IO instruction for reading in the input data required by computation from an external address space and storing the data back into external space after completion of computation.

* * * * *